INVENTORS
Alexander V. Alexeff
Harvey Snyder
BY
ATTORNEYS

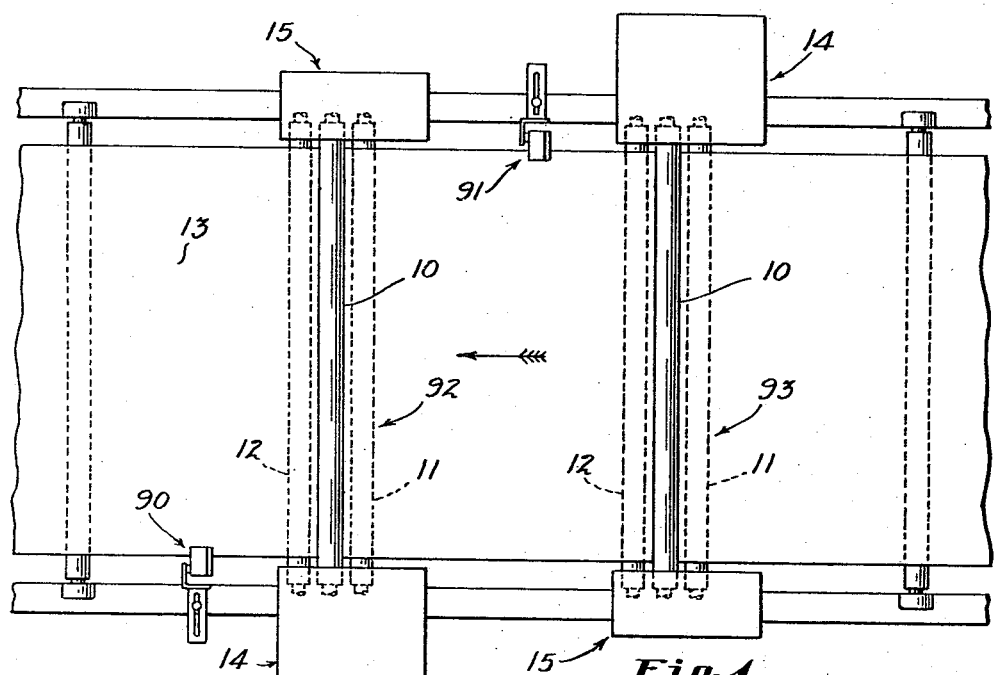
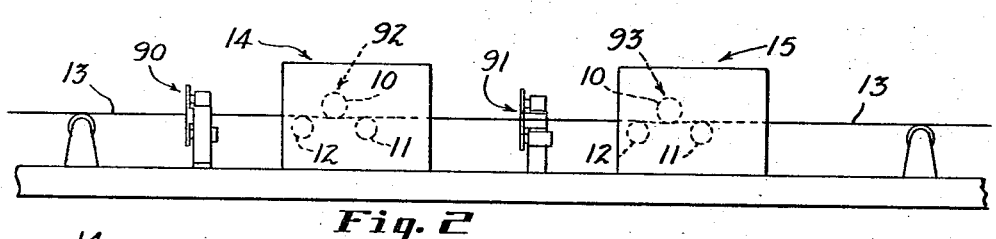
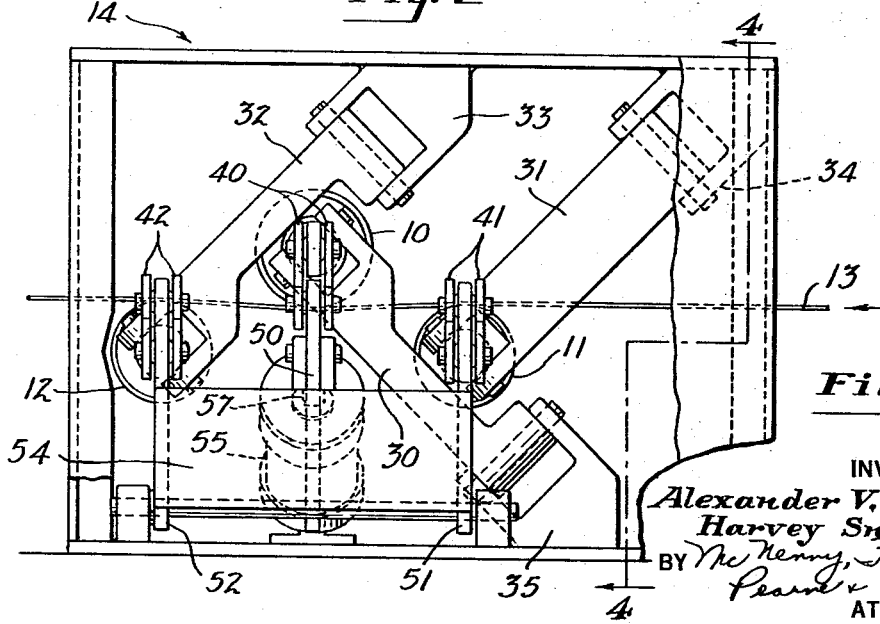

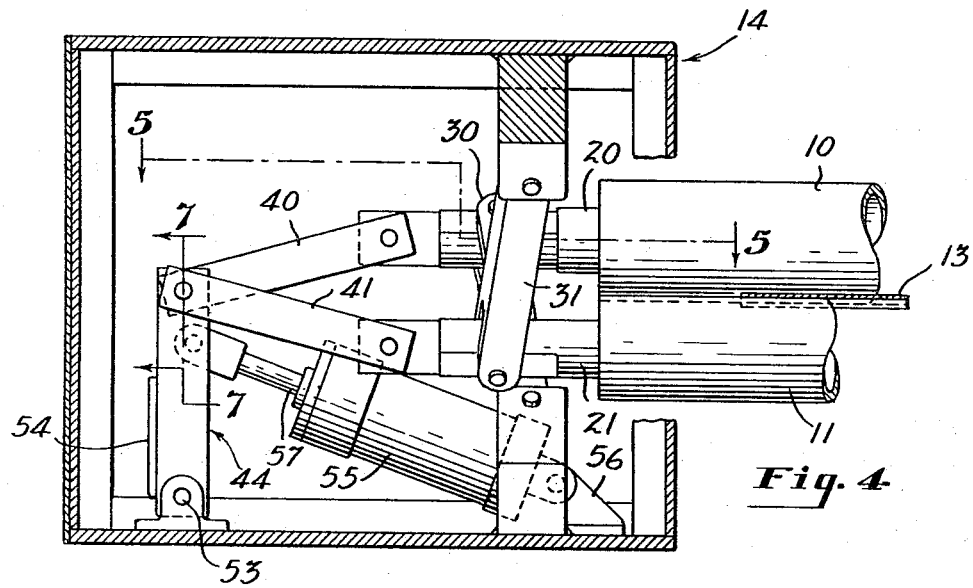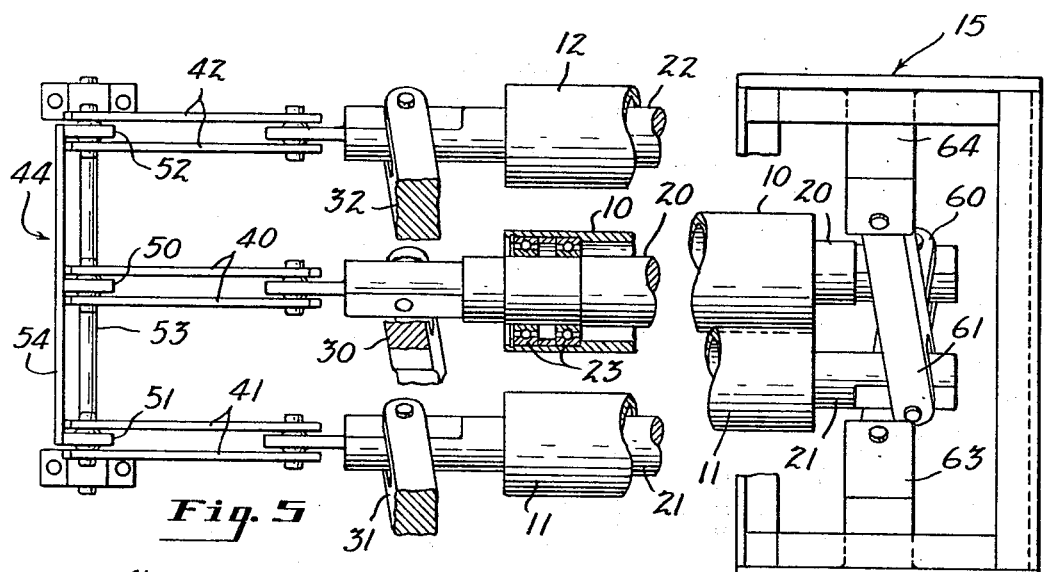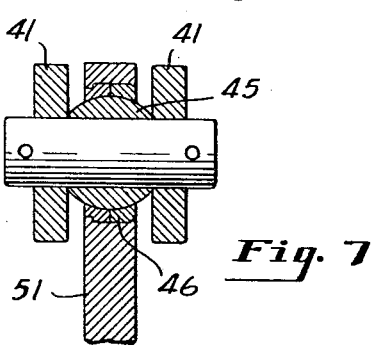

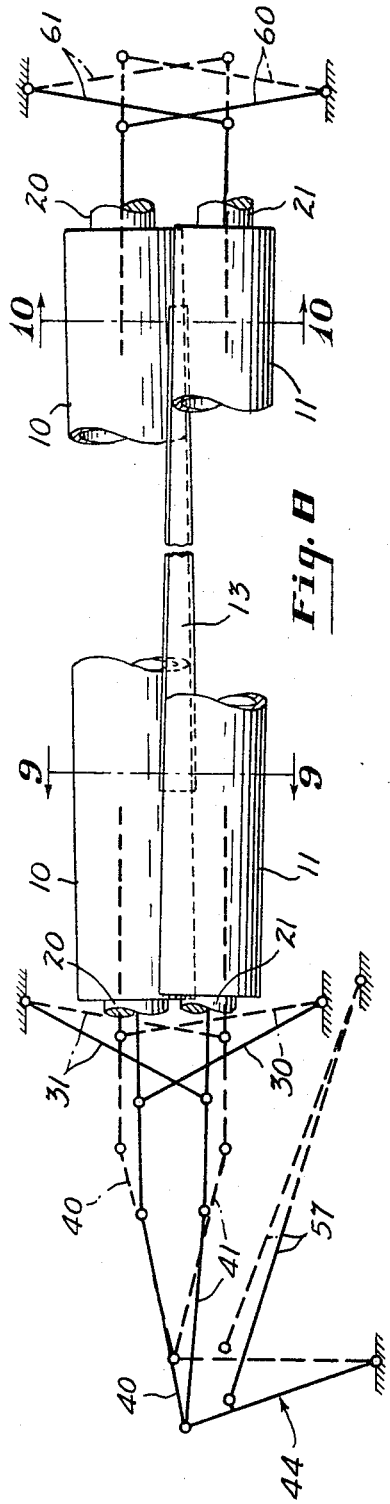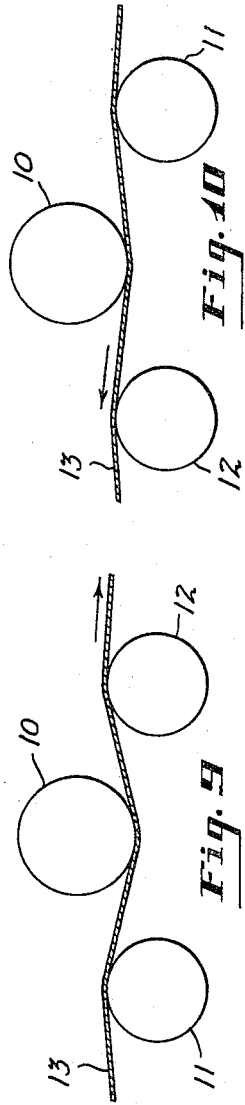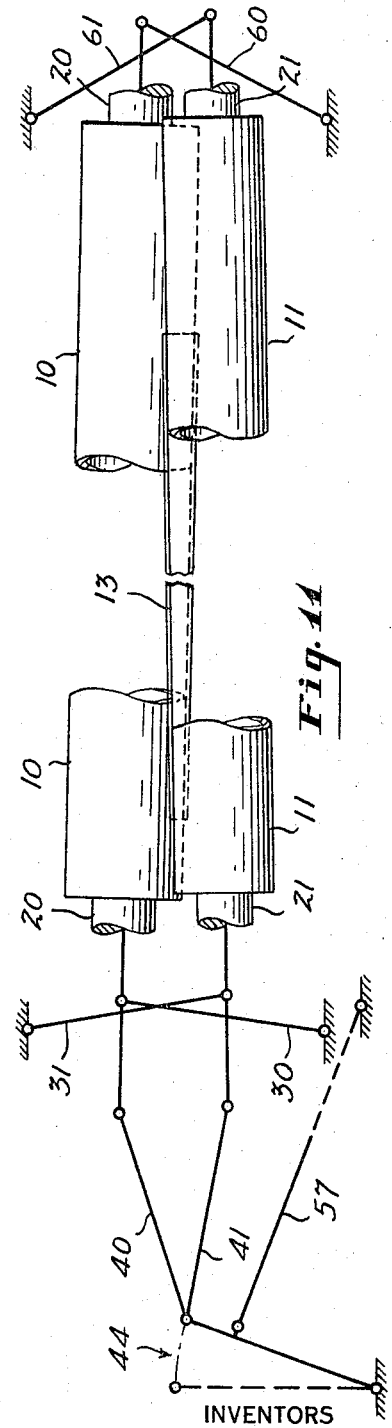

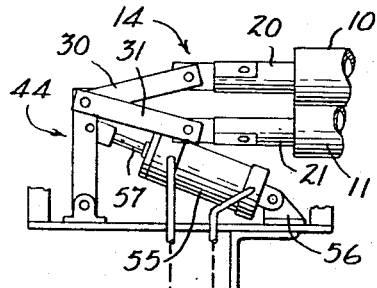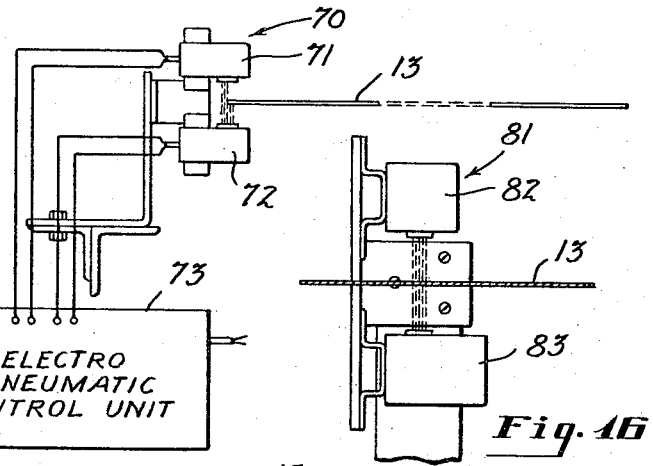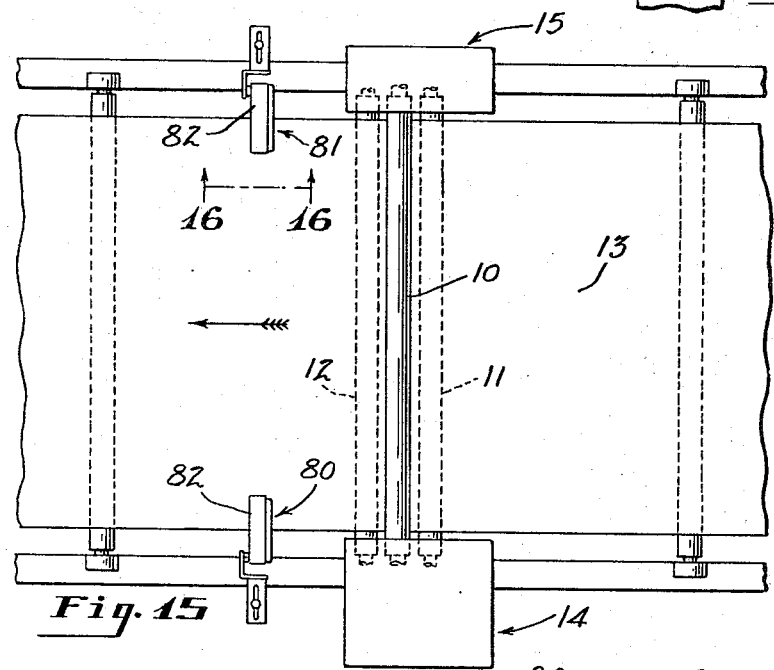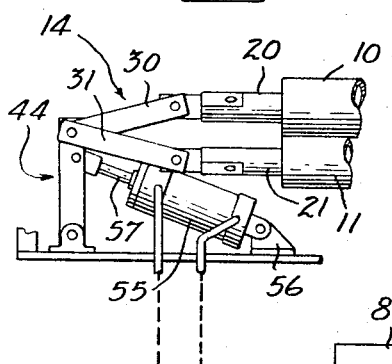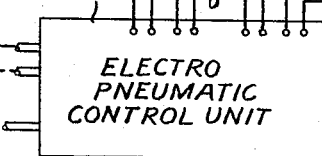

United States Patent Office 3,343,737
Patented Sept. 26, 1967

3,343,737
WEB GUIDING AND EDGE MAINTAINING MEANS
Alexander V. Alexeff and Harvey Snyder, Cleveland, Ohio, assignors to Industrial Ovens, Incorporated, Cleveland, Ohio, a corporation of Ohio
Filed Oct. 22, 1965, Ser. No. 501,033
3 Claims. (Cl. 226—21)

This invention relates to web guiding means and particularly to guide rolls for maintaining edge alignment, center alignment, or both.

The invention involves the provision of a plurality of adjustment factors in a compact web guiding apparatus. According to the invention, there is provided the use of means responsive to web edge and/or center deviation for directing roll journaling means to correct edge or center deviations from a predetermined path of travel. The invention involves the provision of a plurality of adjustment factors in a compact web guiding apparatus. According to the invention a plurality of rolls are provided which are adapted to skew with respect to each other to varying degrees and simultaneously to adjust to different degrees of profile interference. In this connection, the present invention contemplates the provision of such apparatus where the degree of profile interference at any given adjustment of the rolls varies across at least part of the extent of the web width due, for example, to the skewing relationship between the rolls so that there is under most or all conditions a greater amount of wrap of the roll means and the web at the edge of the web than at points on the web located transversely inwardly from the edge. During the adjustment of the rolls to different degrees of profile interference, the rolls are simultaneously shifted in the direction of center or edge deviation to accomplish quick-correct transverse translation of the web and the rolls are also canted so that they are angularly displaced from a normal relationship with respect to a normal-to-web-path attitude.

Stated in other terms, according to the invention a plurality of rolls are provided, planar projections of which are adapted to adjust their angular spacing with respect to each other to varying degrees and simultaneously to adjust to different degrees of interference. The projections of the rolls referred to here are those in a plane transverse to the path of web travel. Such projections will hereinafter be referred to as transverse-plane projections. As the different degrees of roll profile interference obtain, the rolls are shifted laterally as a unit so that each increment of each roll is displaced a like amount with respect to the web and are canted with respect to their normal-to-web-path attitude.

The roll means according to this invention are mounted as beams which are suspended at their ends. A particularly advantageous feature of this invention is that both ends of each beam are similarly mounted and that the profile interference correcting action that is taken by the portions of that roll that are adjacent to the deviating web edge is accompanied by a tendency of the remaining portions of that roll to attain a degree of zero profile interference.

Other advantageous adjustments are contemplated by certain aspects of the invention, as disclosed below.

Examples of the invention are illustrated in the accompanying drawings, in which:

FIGURE 1 is a plan view of web guiding apparatus embodying the invention and showing the apparatus as a means to maintain web width by maintaining both center and edge alignment.

FIGURE 2 is an elevational view of the apparatus shown in FIGURE 1.

FIGURE 3 is an enlarged elevational end view of roll means and control linkages embodying the invention, with portions broken away for clarity.

FIGURE 4 is a cross-sectional view of the apparatus shown in FIGURE 3, the plane of the section being indicated by the line 4—4 in FIGURE 3.

FIGURE 5 is a cross-sectional view of the apparatus, the plane of the section being indicated by the line 5—5 in FIGURE 4.

FIGURE 6 is a fragmentary side elevational view similar to FIGURE 4 but showing the supporting linkage at the opposite end of the roll means illustrated in FIGURE 4.

FIGURE 7 is an enlarged cross-sectional view, the plane of the section being indicated by the line 7—7 in FIGURE 4.

FIGURE 8 is a view similar to FIGURES 4 and 6, with the mounting linkages shown in diagrammatic form and with the apparatus shown in solid outline in one of two limiting extreme conditions and in phantom outline in a neutral position.

FIGURE 9 is a cross-sectional view, the plane of the section being indicated by the line 9—9 in FIGURE 8.

FIGURE 10 is a cross-sectional view, the plane of the section being indicated by the line 10—10 in FIGURE 8.

FIGURE 11 is a diagrammatic view similar to FIGURE 8 but showing the apparatus in the other of the two limiting conditions.

FIGURE 14 is a partially diagrammatic view illustrating the invention when employed as an edge guiding apparatus.

FIGURE 15 is a plan view of a device according to the present invention showing the device employed as a center guide.

FIGURE 16 is a cross-sectional view, the plane of the section being indicated by the line 16—16 in FIGURE 15.

FIGURE 17 is a partially diagrammatic view illustrating the invention when employed as a center guiding apparatus.

Figure 13:
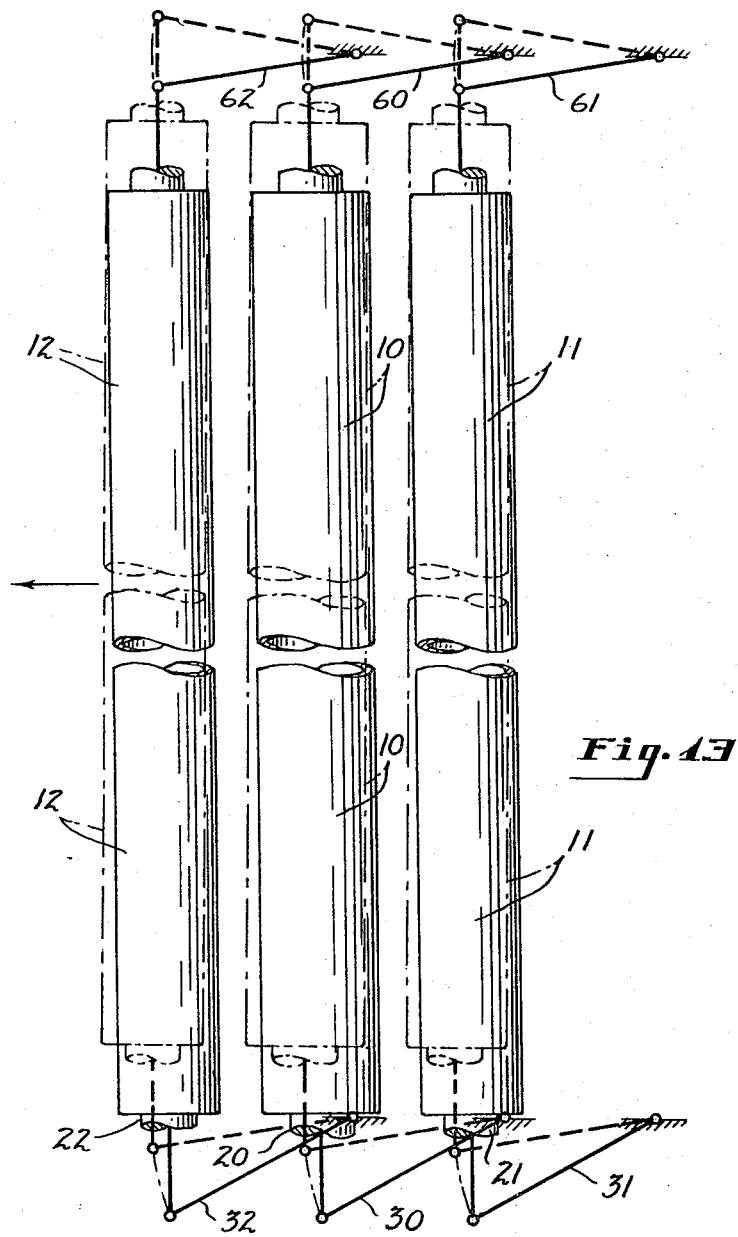
FIGURE 13 is a diagrammatic plan view of the roll means according to this invention showing the roll means in phantom outline in a neutral position and in solid outline in a limiting extreme condition.

As shown in the drawings, there are provided first roll means comprising a single roll 10 and second roll means comprising a pair of rolls 11 and 12. As will hereinafter become apparent, the rolls 11 and 12 move as a unit. The several rolls are in guiding relationship with respect to a passing web 13 which is moving in the direction indicated by the arrows in the figures. The roll 11 of the pair of rolls 11 and 12 which comprise the second roll means is located on the approach side of the single roll 10; and the roll 12 of the pair of rolls 11 and 12 which comprise the second roll means is located on the withdrawal side of the single roll 10.

Although in the particular invention described, the second roll means comprises the pair of rolls 11 and 12, some aspects of the invention contemplate the provision of only a single roll. In this connection, one of the roll means 11 or 12 could be eliminated and many of the features and advantages of the present invention would nevertheless obtain.

Each of the rolls 10–12 is mounted at one of its ends by a roll mounting means 14 and at its other end by a roll mounting means 15. Each of the rolls 10–12 extends between the mounting means 14 and 15 across the transverse extent of the passing web 13. Each of the rolls 10–12 is journaled on its own shaft 20–22 by journal means 23 (FIG. 5).

The mounting means 14 includes guiding links 30–32. The links 30–32 have forked end portions which are respectively pivoted to flattened end portions of the shafts 20–22. The other end of each link 30–32 is respectively pivoted to a support member 33–35. The pivotal connections between the links 30–32 are in a vertical plane which extends in the direction of desired web travel. The pivotal connections between the links 30–32 and the shafts 20–22 define a plane which is parallel to the previously mentioned vertical plane and which remains parallel to that plane or coplanar with the plane between two limiting extreme conditions which will hereinafter be explained.

Each guide means 14 further includes doubled driving arms 40–42 which are respectively pivoted at one end to a flattened end portion of each shaft 20–22. The other end of each doubled driving arm 40–42 is mounted on a swinging frame 44. As may be seen most clearly in FIGURE 7, each end of each doubled driving arm 40–42 carries a spherical bearing 45 which is mounted for universal movement within an outer race 46. The frame 44 comprises lever arms 50–52 which are connected at their upper ends to a race 46 and are fixed at their lower ends to a pivoted cross rod 53. The lever arms 50–52 are tied together by a tie plate 54 and may be swung in unison by a double acting fluid actuated cylinder 55. The cylinder 55 is pivoted at one end to a bracket 56 and a cylinder ram 57 is pivoted at its free end to the lever arm 50.

The other end of each shaft 20–22 is carried by the mounting means 15 and each shaft 20–22 is suspended in a manner which is complementary to the suspension of the opposite end of each shaft 20–22 in the mounting means 15.

The mounting means 15 includes guiding links 60–62. The links 60–62 have forked end portions which are respectively pivoted to flattened end portions of the shafts 20–22. The other end of each link 60–62 is respectively pivoted to a support member 63–65. The pivotal connections between the links 60–62 and the support members 63–65 are in a vertical plane which extends in the diretoin of desired web travel. The pivotal connections between the links 60–62 and the shafts 20–22 define a plane which is parallel to the previously mentioned vertical plane and which remains parallel to that plane or coplanar with that plane between two limiting extreme conditions which will hereinafter be explained.

In FIGURES 1 through 7 and 14 through 17, the rolls 10–12 are illustrated in a neutral position that is responsive to a predetermined web edge location and web edge direction and/or a predetermined web center line location and direction. In their illustrated neutral position, the rolls 10–12 are normal to the web-path attitude, are in a centered position with respect to the mounting means 14 and 15, and are positioned so that their axes are mutually parallel and so that there is substantially zero profile interference between the first and second roll means. In this position, however, it may be desirable to have a relatively low degree of profile interference between the first and second roll means with the rolls in a non-skewed relationship so that the rolls maintain a degree of sensing contact with the passing web.

If the web guiding means according to this invention is to be employed as a means to control the web in response to the position of one edge of the web, an edge sensor 70 (FIG. 14) is provided in the vicinity of the guiding apparatus at one side of the web. The sensor 70 may comprise a photocell housing 71 and a light source housing 72. The light source housing 72 projects a band of light on the photocell and this band is partially blocked by the passing web 13. The degree of light striking the photocell in the housing 71 determines whether fluid is introduced into or exhausted from the cylinder 55 to advance or retract the cylinder ram 57. When the passing web 13 blocks off about one-half of the light from the light source 72, the rolls 10–12 are held in the previously described neutral web guiding position which is illustrated in phantom outline in FIGURES 12 and 13. If the passing web shifts to the right as viewed in FIGURE 14, or towards the roll mounting means 15, a control unit 73 admits air behind the cylinder ram to shift the frame to the left as viewed in FIGURES 8 and 14.

Figure 12:
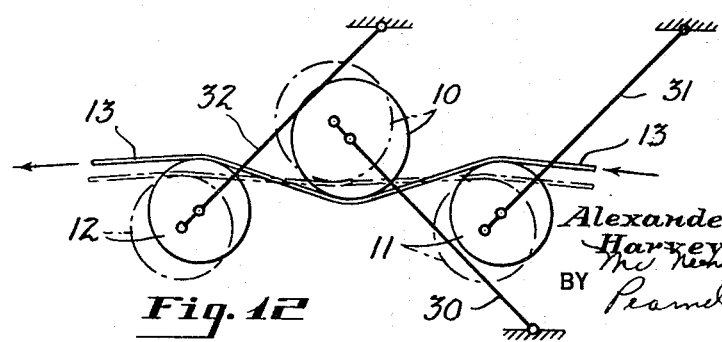
FIGURE 12 is a diagrammatic side elevational view of the roll means according to this invention showing the roll means in phantom outline in a neutral position and in solid outline in a limiting extreme condition.

It will be seen from FIGURES 3, 4, 8, and 12 that the roll mounting means 14 comprising the linkages described above is such as to progressively adjust the profile relationship of the first roll means (the roll 10) on the one hand and the second roll means (the rolls 11 and 12) on the other hand relative to each other as the frame is swung in a counterclockwise direction by the cylinder 55 from a first condition illustrated in phantom outline in FIGURES 12 and 13, where there is a zero degree of (1) skewing and a relatively low degree of (2) profile interference between the first and second roll means to a second condition illustrated in solid outline in FIGURES 8, 9, 12, and 13, where there are relatively high degrees of (1) skewing and (2) profile interference.

As the second condition obtains, the plane defined by the pivotal connections between the shafts 20–22 and the links 30–32 moves outwardly with respect to the plane defined by the pivotal connections between the links 30–32 and the brackets 33–35 and remains parallel to that plane. This causes the rolls 10–12 to shift as a unit in the direction opposite the direction of web edge deviation. Since the pivotal connections between the brackets 33–35 and the links 30–32 are spaced upstream with respect to the web and the pivotal connection between the links 30–32 and the rolls 10–12, the rolls are canted from a zero degree of angular displacement from normal-to-web-path attitude to a relatively high degree of such angular displacement, as illustrated in FIGURE 13. As will be clear from FIGURE 13, the term "normal" as used in the expression "normal-to-web-path attitude" has reference to a relationship of perpendicularity to the center line of the traveling web or, equivalently, a relationship of perpendicularity to any line or plane parallel to such center line of the traveling web.

Thus, it may be seen that as the ram 57 of the cylinder 55 is extended to move the rolls 10–12 toward the roll support means 14, the rolls are simultaneously moved from (A) a condition in which there is a zero degree of (1) skewing and (2) profile interference; a centered position with respect to the mounting means 14 and 15; and a condition where there is a zero degree of angular displacement from normal-to-web-path attitude to (B) a condition where there is a relatively high degree of (1) skewing and (2) profile interference; a condition where the roll means are shifted toward the mounting means 14; and a condition wherein the rolls are canted with a relatively high degree of angular displacement from normal-to-web-path attitude.

As may be seen in FIGURE 13, the mounting means 15 permits the rolls 10–12 to be shifted toward the mounting means 14. As may be seen in FIGURE 13, however, the ends of the rolls 10–12 which are carried by the mounting means 15 are displaced in the direction of web travel as they are shifted from their neutral position indicated in dotted outline to a limiting extreme condition indicated in solid outline in that figure. The linkage arrangement in each roll mounting means 14 and 15 is such that when the rolls are shifted toward the other roll mounting means from a neutral position to an extreme limiting condition, each roll is displaced laterally with respect to the passing web but is not substantially displaced with respect to the position of its axis in the neutral position. Considering the roll 12 as representative of the other rolls with respect to the previously described shifting action, a line defined by the pivot point between the link 32 and the shaft 22 and the pivot point defined by the link 62 and the shaft 22 is in a normal-to-web-path attitude when the roll 12 is in its neutral position. As the roll 12 is shifted from this neutral position toward the roll mounting means 14, the pivotal connection between the shaft 22 and the link 52 traverses an arc which curves first in the direction of web travel and then back to the previously described line during the shifting of the roll 12. Simultaneously, the pivotal connection between the shaft 22 and the link 32 traverses an arc which curves away from the direction of web travel and, when the limiting extreme position is attained, the pivotal connection between the shaft 22 and the link 32 is displaced from the line connecting the links with the shaft 22 when the roll 12 is in its neutral position.

Referring now to FIGURES 1 through 11, the linkage arrangement in each mounting means 14 and 15 is such that when the rolls are shifted toward the other mounting means from a neutral position to an extreme limiting condition, the end of the roll which is opposite the roll mounting means toward which the roll is shifted is not substantially displaced with respect to the position of its axis in the neutral position. When the rolls are in an extreme limiting condition, therefore, there is substantially zero profile interference between the ends of the rolls that are adjacent the roll mounting means 15 and a progressively higher degree of skewing and profile interference across the web toward the roll mounting means 14 or the mounting means toward which the rolls 10–12 are shifted. A plane, defined by (1) the pivot point between the link 31 and the shaft 21; (2) the pivot point between the link 61 and the shaft 21; (3) the pivot point defined by the link 32 and the shaft 22; and (4) the pivot point defined by the link 62 and the shaft 22, is parallel to the plane of the web when the rolls 11 and 12 are in a neutral position. A line, defined by the pivot point between the link 30 and the shaft 20 and the pivot point defined by the link 60 and the shaft 20, is parallel to the plane defined by the web when the roll 10 is in its neutral position. As the rolls 10–12 are shifted from this neutral position toward the roll mounting means 14, the pivotal connections between the shaft 21 and the link 61 and between the shaft 22 and the link 62 traverse arcs which curve downwardly from the neutral position plane and then back to that plane during the shifting of the rolls 11 and 12. As the roll 10 is simultaneously shifted from its neutral position toward the roll mounting means 14, the pivotal connection between the shaft 20 and the link 60 traverses an arc which curves upwardly away from and then back to the neutral position line of the roll 10. Simultaneously, the pivot points between the shaft 21 and the link 31 and between the shaft 22 and the link 32 traverse arcs which curve upwardly away from the neutral position plane and, when the limiting extreme position is attained, the pivotal connections between the shaft 21 and the link 31 and between the shaft 22 and the link 32 are displaced from the neutral position plane. The pivot point between the shaft 20 and the link 30 traverses an arc which curves downwardly away from the previously mentioned neutral position line and when the limiting extreme condition is attained, the pivotal connection between the shaft 20 and the link 30 is displaced from the neutral position line.

If the passing web shifts to the left, as viewed in FIGURE 14, or toward the roll mounting means 15, the photocell 71 signals the control unit 73 to admit air ahead of the cylinder ram to shift the frame to the right as viewed in FIGURES 11 and 14. This shifting action causes the web to move back toward its centered position.

If the web guiding means according to this invention is to be employed as a means to control the web in response to the center line of the web, edge sensors 80 and 81 (FIGS. 15, 16, and 17) are provided at opposite edges of the web 13 in the vicinity of the guiding apparatus. The sensors 80 and 81 may be similar to the sensor 70 and comprise a photocell housing 82 and a light source housing 83. Each light source housing 83 projects a band of light on its photocell 82 and this band is partially blocked by the passing web 13. The difference in intensity between the light striking the photocell housing of the sensor 80 on the one hand and the degree of light striking the photocell in the sensor 81 on the other hand determines whether fluid is introduced into or exhausted from the cylinder 55 to advance or retract the cylinder ram. If the traveling web 13 tends to shaft to the left as viewed in FIGURE 17, or toward the roll mounting means 14, a control unit 84 admits air ahead of the cylinder ram to shift the frame to the right as viewed in FIGURE 17. This shifting action will tend to move the web 13 back to its centered position. If, on the other hand, the passing web shifts to the right as viewed in FIGURE 17, or toward the roll mounting means 15, the control unit 84 admits air behind the cylinder ram to shift the frame to the left as viewed in FIGURE 17. This shifting action will tend to move the web 13 back to its centered position. Since the sensors 80 and 81 transmit a signal to the unit 84 only when there is a difference in degree between the light striking the photocell in the sensor 80 on the one hand and the light striking the photocell in the sensor 81 on the other hand, the system will tend to align the center of the passing web 13 along a predetermined path and ignore variations in web width.

The web guiding means according to this invention may be employed as a means to control web width and such an arrangement is shown in FIGURES 1 and 2. In FIGURES 1 and 2 edge sensors 90 and 91 are provided on opposite edges of the passing web 13. The web sensors 90 and 91 are each similar to the previously described sensor 70 (FIGURE 14) and are respectively associated with a first guide means 92 and a second guide means 93. The guide means 92 and 93 are respectively responsive to the sensors 90 and 91 to maintain web edge alignment along a predetermined path. By maintaining alignment of both edges, therefore, the arrangement shown in FIGURES 1 and 2 of the drawing controls the width of the traveling web.

The invention is not restricted to the slavish imitation of each and every one of the details described above, which have been set forth merely by way of example with the intent of most clearly setting forth the teaching of the invention. Obviously, devices may be provided which change, eliminate or add certain specific structural details without departing from the invention.

What is claimed is:

1. Web guiding aparatus comprising first and second roll means for guidingly engaging a web traveling along a given direction and extending under one of said first and second roll means and over the other whereby the degree of interference between the web-engaging profiles of the first and second roll means as viewed along said direction of web travel determines the degree of wrap of said web thereon, said first and second roll means each traversing the entire web width, roll mounting means to progressively adjust the profile relationship of said first and second roll means relative to each other back and forth from or through a first or centered condition at which, as between said first and second roll means, there are relatively low degrees of (1) skewing and (2) profile interference to either one of laterally opposed second and third conditions at each of which, as between said first and second roll means, there are relatively high degrees of (1) skewing and (2) profile interference, with said profile interference being highest at one end of said first and second roll means at said second condition and at the other end of said first and second roll means at said third condition.

2. Web guiding apparatus comprising first and second roll means for guidingly engaging a web traveling along a given direction and extending under one of said first and second roll means and over the other whereby the degree of interference between the web-engaging profiles of the first and second roll means as viewed along said direction of web travel determines the degree of wrap of said web thereon, said first and second roll means each traversing the entire web width, roll mounting means to progressively adjust the profile relationship of said first and second roll means relative to each other back and forth from or through a first or centered condition at which, as between said first and second roll means, there are relatively low degrees of (1) skewing and (2) profile interference to either one of laterally opposed second and third conditions at each of which, as between said first and second roll means, there are relatively high degrees of (1) skewing and (2) profile interference, with said profile interference being highest at one end of said first and second roll means at said second condition and at the other end of said first and second roll means at said third condition, and said roll mounting means including means for progressively shifting said first and second roll means longitudinally (laterally with respect to the direction of web travel) as they adjust from or through said first or centered condition to said laterally opposed second and third conditions.

3. Web guiding apparatus comprising first and second roll means for guidingly engaging a web traveling along a given direction and extending under one of said first and second roll means and over the other whereby the degree of interference between the web-engaging profiles of the first and second roll means as viewed along said direction of web travel determines the degree of wrap of said web thereon, said first and second roll means each traversing the entire web width, roll mounting means to progressively adjust the profile relationship of said first and second roll means relative to each other back and forth from or through a first or centered condition at which, as between said first and second roll means, there are relatively low degrees of (1) skewing and (2) profile interference to either one of laterally opposed second and third conditions at each of which, as between said first and second roll means, there are relatively high degrees of (1) skewing and (2) profile interference, with said profile interference being highest at one end of said first and second roll means at said second condition and at the other end of said first and second roll means at said third condition, and said roll mounting means including means for increasing and decreasing the degree of angular displacement of said first and second roll means as they adjust from or through said first or centered condition to said laterally opposed second and third conditions.

References Cited
UNITED STATES PATENTS

| | | | |
|---|---|---|---|
| 3,054,547 | 9/1962 | Alexeff et al. | 226—21 X |
| 3,100,069 | 8/1963 | Richards et al. | 226—17 |

M. HENSON WOOD, Jr., *Primary Examiner.*

ALLEN N. KNOWLES, *Examiner.*